(12) United States Patent
Yamashita et al.

(10) Patent No.: US 8,435,658 B2
(45) Date of Patent: May 7, 2013

(54) SEALED CELL WITH TERMINAL CAP AND SAFETY VALVE

(75) Inventors: Shuichi Yamashita, Tokushima (JP); Shuichi Matsuura, Tokushima (JP); Kenji Yamato, Tokushima (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 353 days.

(21) Appl. No.: 12/732,714

(22) Filed: Mar. 26, 2010

(65) Prior Publication Data
US 2010/0247984 A1   Sep. 30, 2010

(30) Foreign Application Priority Data
Mar. 27, 2009   (JP) .................................. 2009-80072

(51) Int. Cl.
*H01M 2/12* (2006.01)
(52) U.S. Cl.
USPC ............... 429/56; 429/53; 429/164; 429/170; 429/175
(58) Field of Classification Search ............ 429/53, 429/56, 164, 170, 175
See application file for complete search history.

(56) References Cited

U.S. PATENT DOCUMENTS

| | | | | |
|---|---|---|---|---|
| 5,707,756 A * | 1/1998 | Inoue et al. | ...... | 429/57 |
| 5,853,912 A * | 12/1998 | Naing et al. | ...... | 429/61 |
| 2003/0194601 A1* | 10/2003 | Lei | ...... | 429/61 |
| 2007/0154783 A1* | 7/2007 | Jeon | ...... | 429/61 |
| 2008/0020268 A1* | 1/2008 | Hamada et al. | ...... | 429/56 |
| 2009/0081530 A1* | 3/2009 | Hashimoto et al. | ...... | 429/56 |

FOREIGN PATENT DOCUMENTS

| | | |
|---|---|---|
| JP | 64-23873 U | 2/1989 |
| JP | 6-203818 A | 7/1994 |
| JP | 2000-67837 A | 3/2000 |
| JP | 2006-12604 A | 1/2006 |
| JP | 2008-123726 A | 5/2008 |

\* cited by examiner

*Primary Examiner* — Zachary Best
(74) *Attorney, Agent, or Firm* — Westerman, Hattori, Daniels & Adrian, LLP (57) ABSTRACT

A sealed cell has a sealing body with a space-saving safety valve that has excellent safety. The sealing body includes a terminal cap and a safety valve. The terminal cap includes one or more gas releasing holes for releasing a gas from inside to outside of the cell. The gas releasing holes are provided in the external terminal. A safety valve includes a conductive contact portion projecting toward an inside of the sealed cell, a peripheral portion in a periphery of the conductive contact portion, and one or more break grooves formed radially in the peripheral portion. At least one of the gas releasing holes overlap with at least one of break grooves in planar view of the sealed cell.

5 Claims, 11 Drawing Sheets

-PRIOR ART-

US 8,435,658 B2

SEALED CELL WITH TERMINAL CAP AND SAFETY VALVE

BACKGROUND OF THE INVENTION

1. Field of the Invention

The present invention relates to a sealed cell, and more specifically, to the improvement of a sealing body with a safety valve in the sealed cell.

2. Background Art

Non-aqueous electrolyte secondary cells are widely used as the driving power sources of portable devices and electric tools because of their high energy density and high capacity.

These cells using flammable organic solvents are required to ensure safety, and for this reason, the sealing body for sealing such a cell includes a current breaking mechanism and a gas releasing mechanism, which operate when the cell internal pressure increases.

Figure 11:
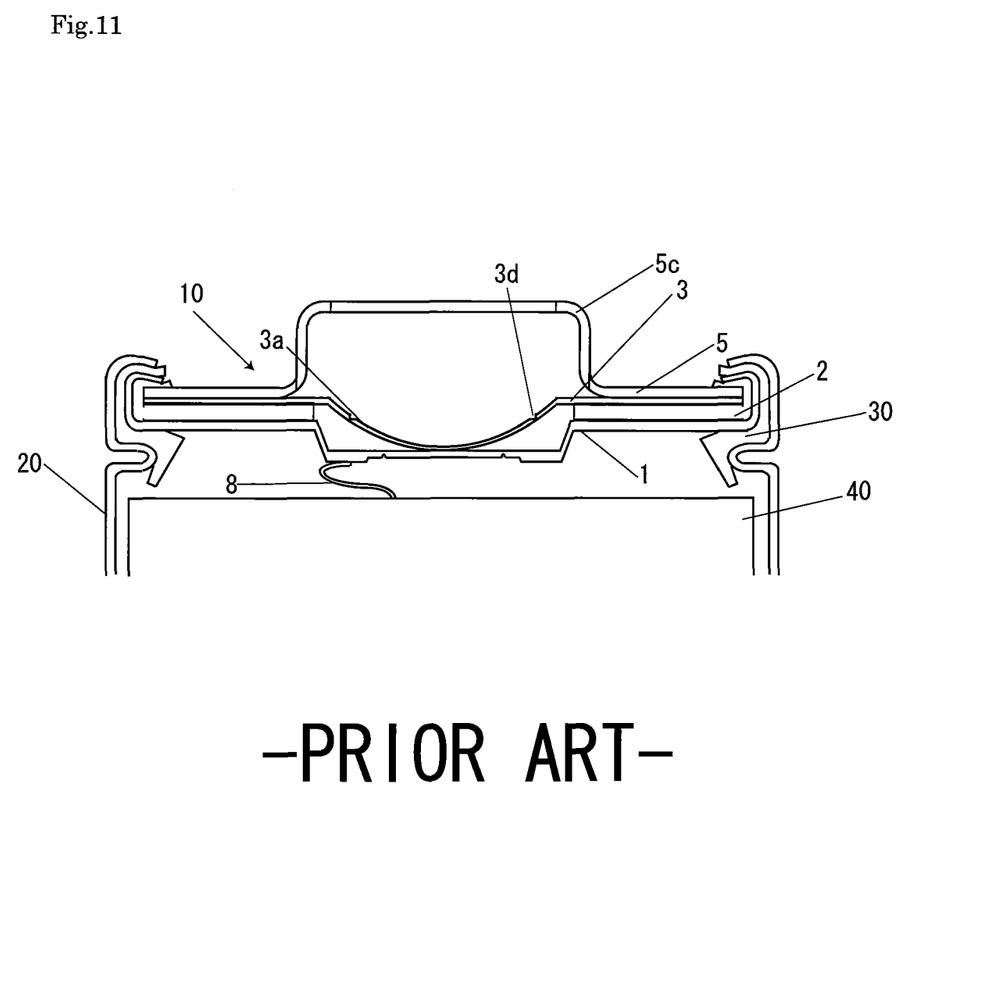
FIG. 11 is a sectional view of a conventional sealed cell.

FIG. 11 shows a sealed cell having a sealing body 10 including conventional current breaking and gas releasing mechanisms. As shown in FIG. 11, the sealing body 10 includes a terminal cap 5, a safety valve 3 disposed on the inner surface of the terminal cap 5, a terminal plate 1 disposed on the inner surface of the safety valve 3, and an insulating member 2 providing isolation and insulation between the safety valve 3 and the terminal plate 1. A current collector tab 8 connected to one of electrodes of an electrode assembly 40 is mounted to the terminal plate 1. In order to keep the conductive contact between a cap terminal 5 and a safety valve 3, the terminal cap 5 and the safety valve 3 are fixed to each other at the periphery. In addition, a convex is formed toward the inside of the cells near the center of the safety valve 3, and a portion near the top of the convex (a conductive contact portion 3a) is welded to the terminal plate 1. A break groove, a thin portion of the terminal plate 1, is formed on the terminal plate 1 at the periphery of the portion welded to the conductive contact portion 3a.

The current breaking mechanism and the gas releasing mechanism of the sealed cell operates as follows. When the cell internal pressure increases, the convex of the safety valve 3 toward the inside of the cells (conductive contact portion 3a) is pushed up toward the outside of the cell. This results in the breakage of the break groove of the terminal plate 1 connected to the conductive contact portion 3a of the safety valve 3, thereby interrupting current supply to the terminal cap 5.

When the cell internal pressure further increases after the breakage of the terminal plate 1, a notch 3d of the safety valve 3 breaks. Thereby, an internal gas is released outside through the broken notch 3d and the gas releasing holes 5c. For this reason, the safety of the cell is further improved.

In the meanwhile, recently, further improvement in volume energy density of the cell is required. Therefore, it is sought to decrease a space of a projection of the terminal cap 5 because the space does not contribute to charge/discharge reaction. However, there is a problem that if the space is decreased, a gas releasing hole is apt to be blocked with a deformed safety valve, and thus sufficient safety is not available.

Well-known techniques on the sealing body of the sealed cell include the following Patent Documents 1 to 5.

Patent Document 1: Japanese Patent Unexamined Publication No. 2000-67837
Patent Document 2: Japanese Patent Unexamined Publication No. 2006-12604
Patent Document 3: Japanese Patent Unexamined Publication No. 2008-123726
Patent Document 4: Japanese Patent Unexamined Publication No. H06-203818
Patent Document 5: Japanese Utility Model Unexamined Publication No. S64-23873

Patent Document 1 describes a sealing plate including a groove, which is formed on the surface of the sealing plate, to cause a crack for releasing gas in the battery when the internal pressure of the battery reaches a predetermined value. And a predetermined area of the sealing plate is drawn into a bowl-like shape. According to this technique, even when a hard material such as stainless steal is used, deformation seldom occurs during processing, and furthermore a groove having a low working pressure enough for a practical use can be easily formed. However, there is a problem in this technique that an internal gas can be released but electrical current cannot be interrupted.

Patent Document 2 describes a technology using a group of sealing plates comprising a rapture plate having a fragile portion that can be easy to break due to increased gas pressure, the cyclic PTC element, a ring-shaped conductive support plate that comprises a thin film covering the space in the ring and having a thin film that can be easy to break due to increased gas pressure, and the terminal plate. In the group of sealing plates, the above-mentioned components are deposited in the above-mentioned order. According to this technology, the rapture plate works stably at the abnormal time such as overcharging, and thus the rupture of the cell can be prevented. However, in this technology, there is a problem of not being able to improve volume energy density of the cell.

Patent Document 3 describes a technology using a safety valve comprising an inner rupture groove and a radial groove that easily ruptures in a substantially radial direction. This radial groove extends toward the outer edge and substantially perpendicular to the inner rupture groove that is shaped in a continuous plane or a discontinuous loop. According to this technology, the above structure operates rapidly when the internal battery pressure is elevated, and can quickly exhaust internal gas. Moreover, this technology provides the safety valve having an excellent strength against falling. However, in this technology, although an internal gas can be released, there is a problem of not being able to interrupt electrical current.

Patent Document 4 describes a technology in which an explosion-proof valve that can deforms in the direction of the internal pressure depending on increased pressure in the battery is welded to a member for mounting a lead plate that is provided inside of the battery. This weld is detachable under a predetermined pressure. According to this technology, a pressure rise can be stopped at an early stage of the increase in the internal pressure, and a temperature rise due to charged current or short-circuit current can be prevented, and also firing or explosion of the battery can be effectively prevented. However, in this technology, there is a problem of not being able to improve volume energy density of batteries.

Patent Document 5 describes a technology to caulk and seal an opening of a outer battery can via a gasket with a first lid made of aluminum alloy or aluminum having 0.2-0.6 mm thickness and a second lid made of hard metal. The first lid comprises a substantially radial thin portion having 50-300 μm thickness and a flange on its periphery. Moreover, gas releasing holes are formed in the second lid. According to this technology, explosion-proof and strength of the battery can be secured. However, in this technology, although an internal gas can be released, there is a problem of not being able to block electrical current.

SUMMARY OF THE INVENTION

The present invention aims at resolving the above problems. Therefore, the object of the present invention is to provide a sealed cell having a sealing body with a space-saving safety valve that can properly interrupt electrical current and release an internal gas when the internal pressure increases.

To solve the above problems, the present invention provides a sealed cell comprising a bottomed cylindrical outer can and a sealing body sealed by caulking around an opening of the outer can.

The sealing body includes:

a terminal cap, the terminal cap including an external terminal projecting toward an outside of the sealed cell, a flange portion in a periphery of the external terminal, and one or more gas releasing holes for releasing a gas from inside to outside of the cell, the gas releasing holes being provided in the external terminal and a safety valve, the safety valve including a conductive contact portion projecting toward an inside of the sealed cell, a peripheral portion in a periphery of the conductive contact portion, and one or more break grooves formed radially in the peripheral portion, wherein at least one of the gas releasing holes overlap with at least one of break grooves in a planar view of the sealed cell.

When an internal short circuit occurs or when heat is applied from outside, the cell internal pressure increases. Thereby, the conductive contact portion is pushed up toward the outside of the cell. This action results in the breakage of the break groove of the terminal plate, thereby interrupting current supply to the terminal cap. Thereafter, the safety valve may be further deformed due to the internal pressure. In this situation, when the gas releasing holes overlaps with the radial break grooves, because the safety valve starts to break from the break grooves, the safety valve cannot deform so as to block the gas releasing holes. For this reason, the safety of the cell is enhanced.

Figure 3A:
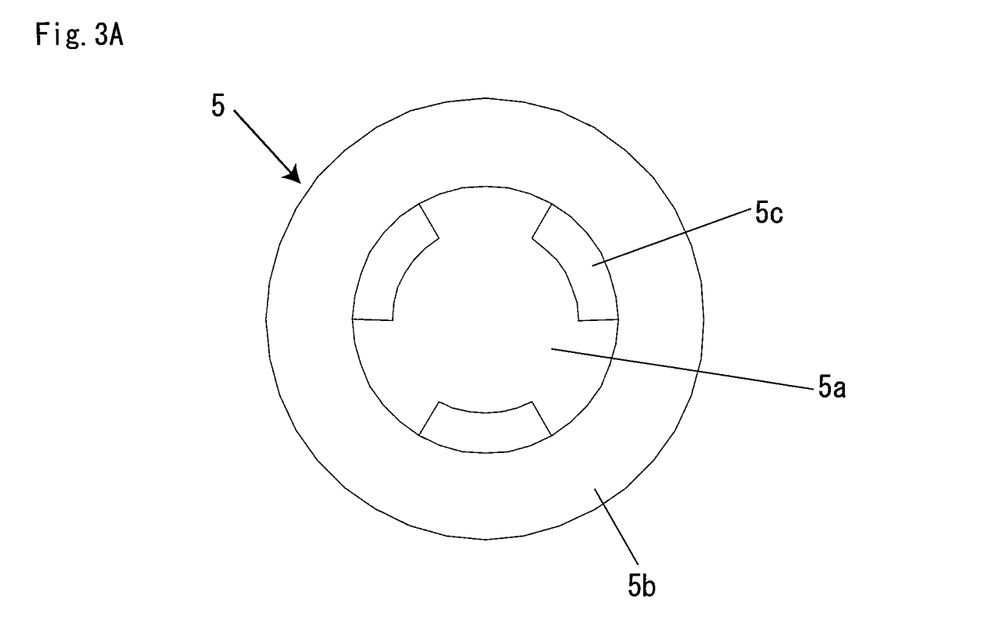
FIGS. 3A and 3B are planar views illustrating an overlap of gas releasing holes and break grooves in the sealed cell according to Example 1.
Figure 3B:
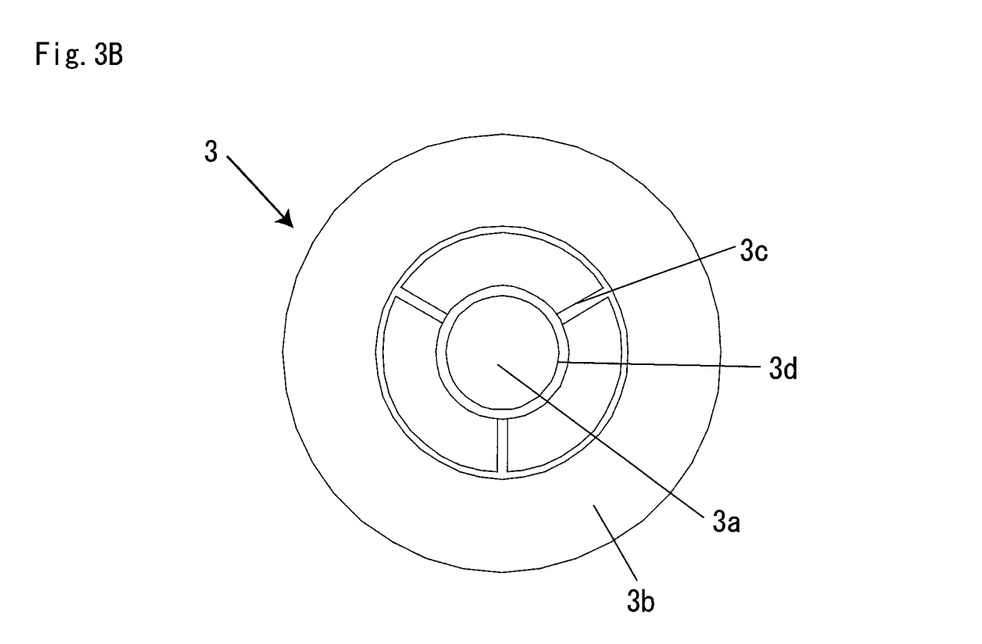

To secure more gas releasing routes, the following configuration is preferred, as shown in FIGS. 3A and 3B. The number of the gas releasing holes $5c$ is set to the same as that of the break grooves $3c$. The number is two or more (for example, each three in FIGS. 3A and 3B). And each of the gas releasing holes $5c$ overlaps with each of the break grooves $3c$.

If the gas releasing holes or the break grooves easily rotates, their overlapping location may change. To prevent this, it is preferable to fix together the safety valve and the terminal cap strongly. This fixing method includes a riveting and a weld.

DETAILED DESCRIPTION OF THE INVENTION

Embodiment 1

Figure 1:
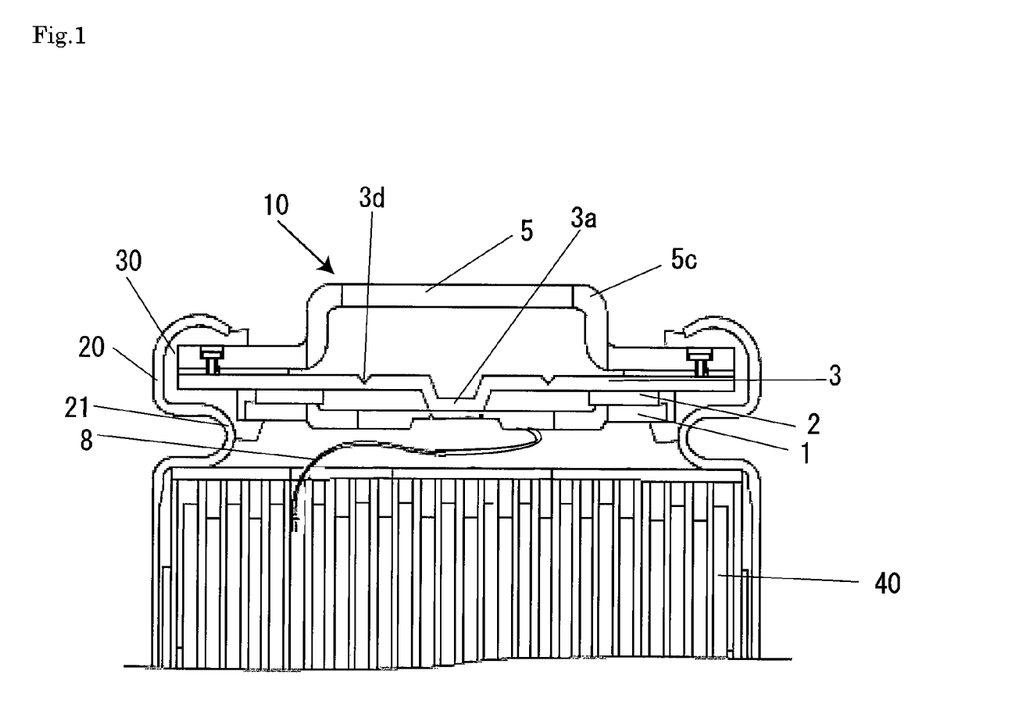
FIG. 1 is a sectional view of a sealed cell according to the present invention.
Figure 2A:
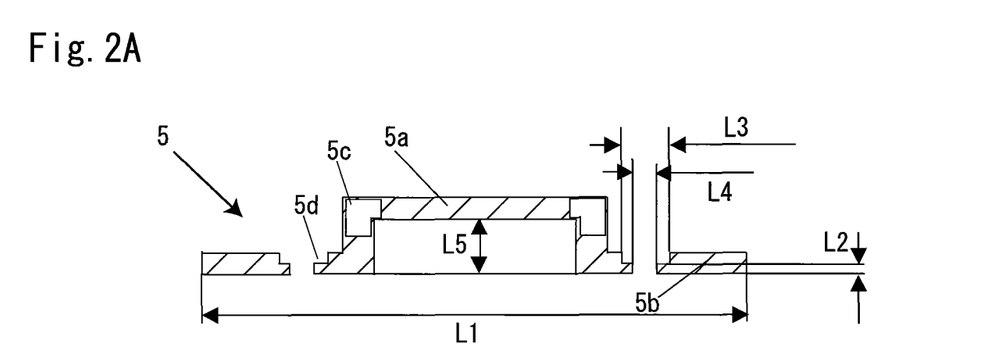
FIGS. 2A and 2B are sectional views of a terminal cap and a safety valve of a sealing body used in the sealed cell according to the present invention, respectively.
Figure 2B:
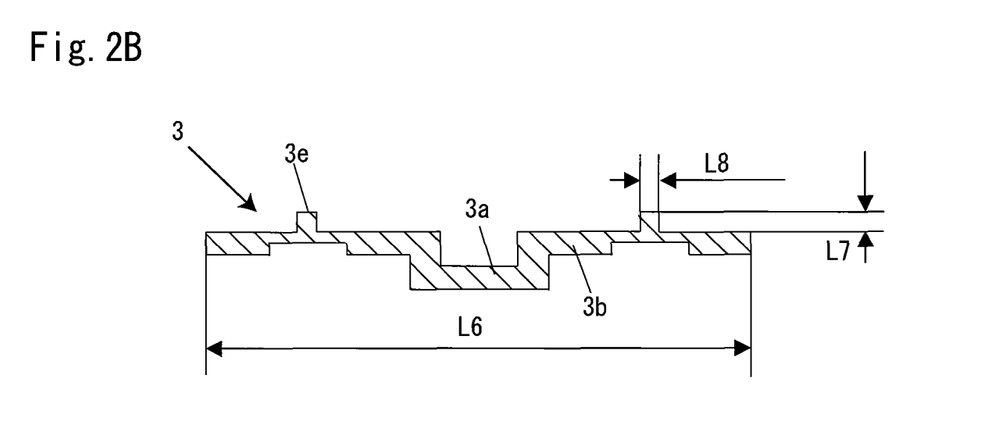

An embodiment of the present invention will be described as follows with reference to drawings, using examples in which the present invention is applied to lithium ion secondary cells. FIG. 1 is a sectional view enlarging the main part of the sealed cell according to Embodiment. FIGS. 2A and 2B are sectional views of a terminal cap and a safety valve according to the present invention. FIGS. 3A and 3B are planar views of gas releasing holes and the break grooves according to the present invention.

As shown in FIG. 1, the sealing body 10 is caulked and sealed via the gasket 30 around an opening of the outer can 20 housing the electrode assembly 40 and a non-aqueous electrolyte. Furthermore, as shown in FIG. 1, the sealing body 10 of the sealed cell according to this embodiment includes a terminal plate 1, a terminal cap 5, a safety valve 3, and an insulating member 2. The terminal plate 1 is electrically connected to either the positive or negative electrode of the electrode assembly 40 via an electrode tab 8. The terminal cap 5 includes an external terminal $5a$ projecting toward the outside of the cell. The safety valve 3 is disposed between the terminal plate 1 and the terminal cap 5 and disconnects the electric connection therebetween due to deformation when the cell internal pressure increases. The insulating member 2 prevents the electric contact between the safety valve 3 and the terminal plate 1 when the safety valve 3 interrupts the flow of current.

As shown in FIG. 2A and FIG. 3A, the terminal cap 5 includes an external terminal $5a$ projecting toward an outside of the sealed cell, a flange portion $5b$ in a periphery of the external terminal $5a$, one or more gas releasing holes $5c$ for releasing a gas from inside to outside of the cell, and counterbored holes $5d$ formed in the flange portion $5b$. The gas releasing holes $5c$ are formed at the corners of the external terminal $5a$. In Embodiment, three gas releasing holes $5c$ are formed.

As shown in FIG. 2B and FIG. 3B, the safety valve 3 includes a conductive contact portion $3a$ projecting toward an inside of the sealed cell, a peripheral portion $3b$ in a periphery of the conductive contact portion $3a$, three break grooves $3c$ formed radially in the peripheral portion $3b$, a notch $3d$ formed circularly in the conductive contact portion $3a$, and pin-like projections $3e$ provided in peripheral portion $3b$.

Figure 6A:
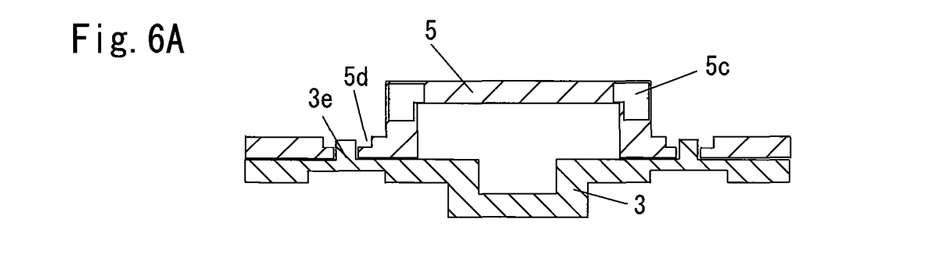
FIGS. 6A to 6C describe a process for fixing together a terminal cap and a safety valve of a sealed cell according to the present invention.
Figure 6B:
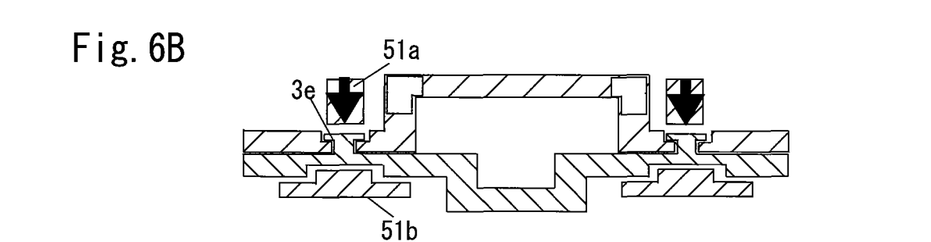
Figure 6C:
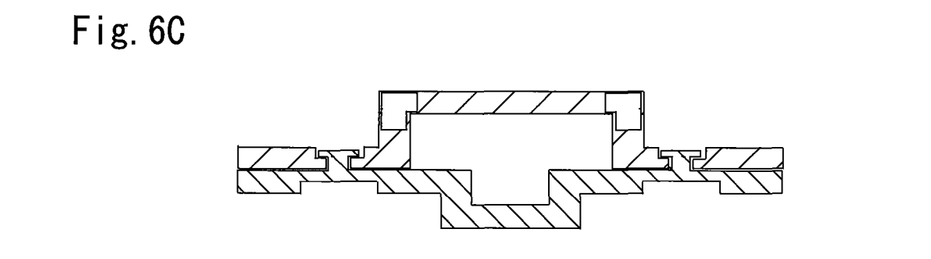

As shown in FIG. 6C, the pin-like projections $3e$ of the safety valve 3 are inserted into the counterbored holes $5d$ of the terminal cap 5. Then, the tip of the pin-like projections $3e$ are crushed to fix the safety valve 3 and the terminal cap 5. In this structure, as shown in FIGS. 3A and 3B, the gas releasing holes $5c$ and the break grooves $3c$ are arranged so that each of the former overlaps with each of the latter.

A method for producing a lithium ion secondary cell having the above structure is explained below.

<Preparation of the Positive Electrode>

Lithium cobalt oxide ($LiCoO_2$) as a positive electrode active material, a carbon-based conductive agent (e.g. acetylene black and graphite), and polyvinylidene fluoride (PVDF) as a binder were weighed in a mass ratio of 90:5:5, dissolved into N-methyl-2-pyrrolidone as an organic solvent, and mixed together to prepare a positive electrode active material slurry.

The slurry was uniformly applied to both sides of a positive electrode core body made of 20 μm thick aluminum foil using a die coater, a doctor blade, or the like.

The electrode plate thus obtained was put in a dryer to remove the organic solvent so as to produce a dried electrode plate. The dried electrode plate was rolled by a roll press machine, cut in size so as to produce a positive electrode.

Examples of the positive electrode active material used in Embodiment include lithium-containing transition metal composite oxides, which can be used alone or in combination of two or more thereof. Examples of the lithium-containing transition metal composite oxides include lithium cobalt oxide used in the above-described embodiment, lithium nickel oxide ($LiNiO_2$), lithium manganese oxide ($LiMn_2O_4$), lithium iron phosphate ($LiFePO_4$), lithium-manganese-nickel-cobalt oxide ($LiMn_xNi_yCo_zO_2$ wherein x+y+z=1), and other oxides obtained by replacing part of a transition metal by another element.

<Preparation of the Negative Electrode>

Artificial graphite as a negative electrode active material, styrene-butadiene rubber as a binder, and carboxymethylcellulose as a viscosity improver were weighed in a mass ratio of 98:1:1, mixed with an appropriate amount of water so as to prepare a negative electrode active material slurry.

The slurry was uniformly applied to both sides of a negative electrode core body made of 15 μm thick copper foil using a die coater, a doctor blade, or the like.

The electrode plate thus obtained was put in a dryer to remove water so as to produce a dried electrode plate. The dried electrode plate was rolled by a roll press machine, cut in size so as to produce a negative electrode.

Examples of the negative electrode material include carbonaceous materials and mixtures of a carbonaceous material and at least one selected from the group consisting of lithium, a lithium alloy, and a metal oxide capable of absorbing and desorbing lithium. Examples of the carbonaceous materials include natural graphite, carbon black, coke, glassy carbons, carbon fibers, and sintered materials thereof.

<Production of the Electrode Assembly>

The positive and negative electrodes thus produced were wound together with a separator made of a polyethylene microporous film by a winder, and applied with an insulating winding-end tape so as to complete a wound electrode assembly.

<Production of the Sealing Body>

Figure 4A:
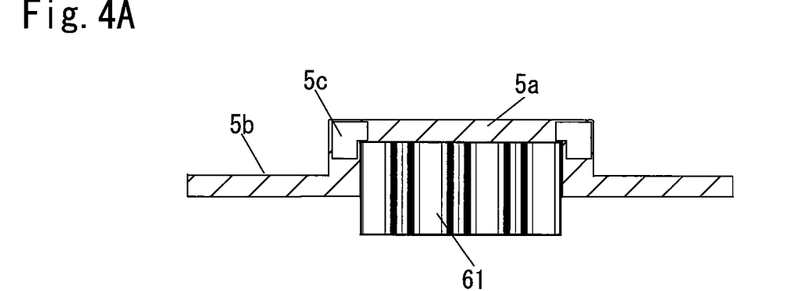
FIGS. 4A to 4D describe a process for producing the terminal cap of the sealed cell according to the present invention.

A nickel-plated iron plate, in which holes had been preformed at the positions for gas releasing holes, was pressed in its center by a press die 61 so as to form an external terminal (a projection) 5a (cf. FIG. 4A). Thereby, the gas releasing holes 5c was formed at the corner of the external terminal 5a.

Figure 4B:
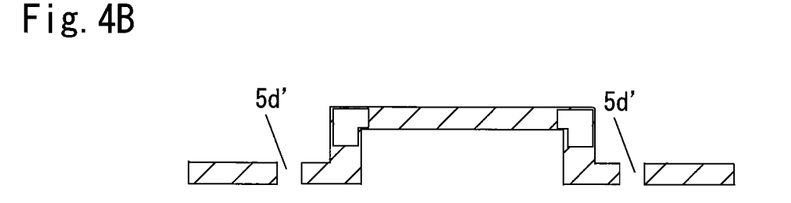

Then, the flange 5b (the outer periphery of the projection) was provided with perforated holes 5d', 5d' (cf. FIG. 4B).

Figure 4C:
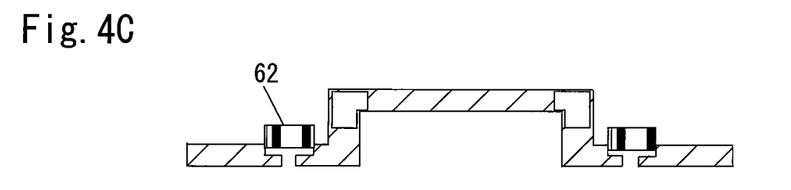

The holes 5d', 5d' were pressed from above by a press die 62 so as to partially increase their diameter as shown in FIG. 4C. At this moment, the diameter of the opposite side (the bottom side) of the holes becomes smaller than the diameter shown in FIG. 4B.

Figure 4D:
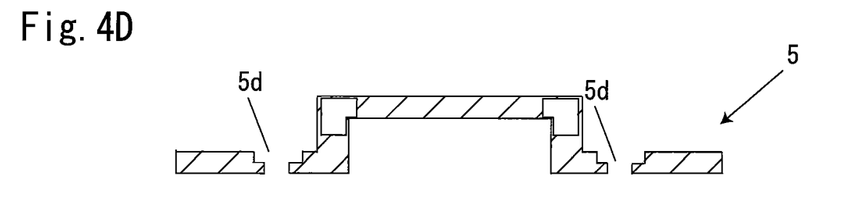

Then, the holes were punched again to increase the diameter of their bottom side as shown in FIG. 4D, which had been reduced by the pressing. Thereby, counterbored holes 5d are formed.

Finally, the iron plate was punched out into a disk so as to complete the terminal cap 5.

<Production of the Safety Valve>

Figure 5A:
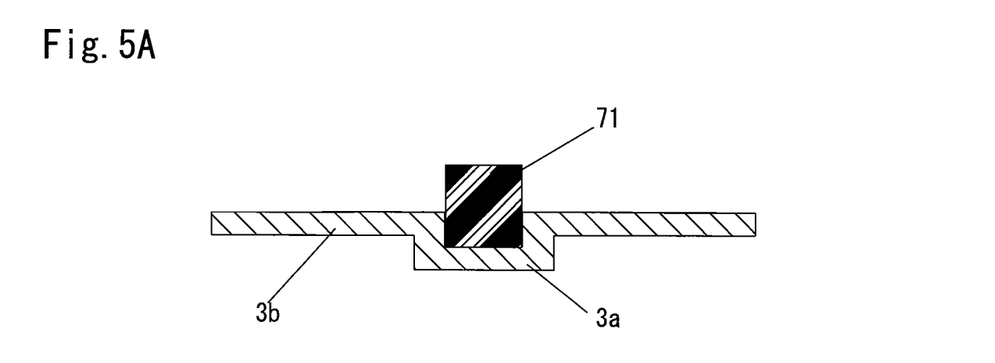
FIGS. 5A to 5C describe a process for producing the safety valve of the sealed cell according to the present invention.
Figure 5B:
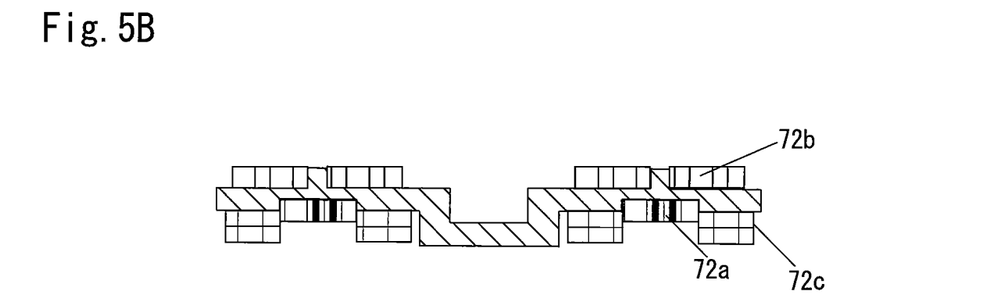

An aluminum plate was pressed in its center by a press die 71 so as to form a conductive contact portion (a recess 3a) as shown in FIG. 5A. Then, a break groove 3c (not shown) and a notch 3d (not shown) are formed by press. Then, the peripheral portion 3b (a periphery of the recess) was pushed from the bottom by press dies 72a, 72b, and 72c so as to form pin-like projections 3e as shown in FIG. 5B. Finally, the aluminum plate was punched out into a disk so as to complete the safety valve 3 with the pin-like projections 3e (cf. FIG. 5C).

Figure 5C:
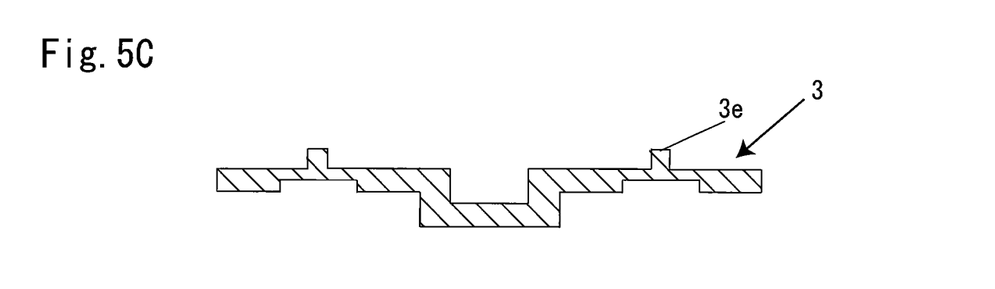

In this production method, hollowed portions are formed on the side opposite to the pin-like projections 3e on the aluminum plate as a result of deformation due to pressing as shown in FIG. 5C; however, these portions are not essential components of the present invention.

Components of the sealed cell in Embodiment have the following dimensions. The terminal cap 5 has a diameter L1 of 16.5 mm and a thickness of 0.7 mm. The counterbored holes 5d have a diameter L3 of 1.4 mm in the large-diameter portion, a diameter L4 of 1.0 mm in the small-diameter portion, and a height L2 of 0.2 mm in the small-diameter portion. The height L5 of the terminal cap is 1.8 mm. The safety valve 3 has a diameter of 16.5 mm and a thickness of 0.4 mm. The pin-like projections 3e have a height L7 of 0.5 mm and a diameter L8 of 0.9 mm. The safety valve 3 includes three pin-like projections 3e, and the terminal cap 5 includes three counterbored holes 5d.

<Riveting Step>

The terminal cap 5 was placed on the upper surface of the safety valve 3 in such a manner that the pin-like projections 3e of the safety valve 3 were inserted into the counterbored holes 5d of the terminal cap 5 (cf. FIG. 6A).

Next, the tips of the pin-like projections 3e were pressed from above and below and crushed by rivet fasteners 51a and 51b so as to form riveted parts (cf. FIG. 6B), thus riveting the safety valve 3 and the terminal cap 5 together (cf. FIG. 6C).

Finally, the aluminum terminal plate 1 was welded to the bottom surface of the safety valve 3 via the polypropylene insulating member 2 so as to complete the sealing body 10.

<Preparation of the Electrolytic Solution>

An electrolytic solution was produced by forming a non-aqueous solvent containing ethylene carbonate (EC), propylene carbonate (PC), and diethyl carbonate (DEC) in a volume ratio of 1:1:8 (in terms of 1 atm at 25° C.), and then dissolving $LiPF_6$ as an electrolyte salt at 1.0 M (mol/L) in this non-aqueous solvent.

Besides the aforementioned combination of EC, PC, and DEC, the non-aqueous solvent can be a mixture of one or more high dielectric solvent having a high solubility of lithium salt and one or more low-viscosity solvent. Examples of the high dielectric solvent include ethylene carbonate, propylene carbonate, butylene carbonate, and γ-butyrolactone. Examples of the low-viscosity solvent include diethyl carbonate, dimethyl carbonate, ethyl methyl carbonate, 1,2-dimethoxyethane, tetrahydrofuran, anisole, 1,4-dioxane, 4-methyl-2-pentanone, cyclohexanone, acetonitrile, propionitrile, dimethylformamide, sulfolane, methyl formate, ethyl formate, methyl acetate, ethyl acetate, propyl acetate, and ethyl propionate.

Besides LiPF$_6$ used in the embodiment, examples of the electrolyte salt include LiN(C$_2$F$_5$SO$_2$)$_2$, LiN(CF$_3$SO$_2$)$_2$, LiClO$_4$ and LiBF$_4$ all of which can be used alone or in combination of two or more.

<Assembly of the Cell>

A negative electrode current collector of the electrode assembly was welded to the bottom of a cylindrical outer can, and the outer can was filled with the electrolytic solution. The terminal plate 1 of the sealing body 10 and a positive electrode current collector of the electrode assembly 40 were electrically connected via the electrode tab 8. Finally, the opening of the outer can was caulked and sealed via the polypropylene gasket 30 so as to complete the cell according to Embodiment of the present invention.

EXAMPLE 1

Cells according to Example 1 were manufactured in the same manner as in the above Embodiment.

EXAMPLE 2

Figure 7A:
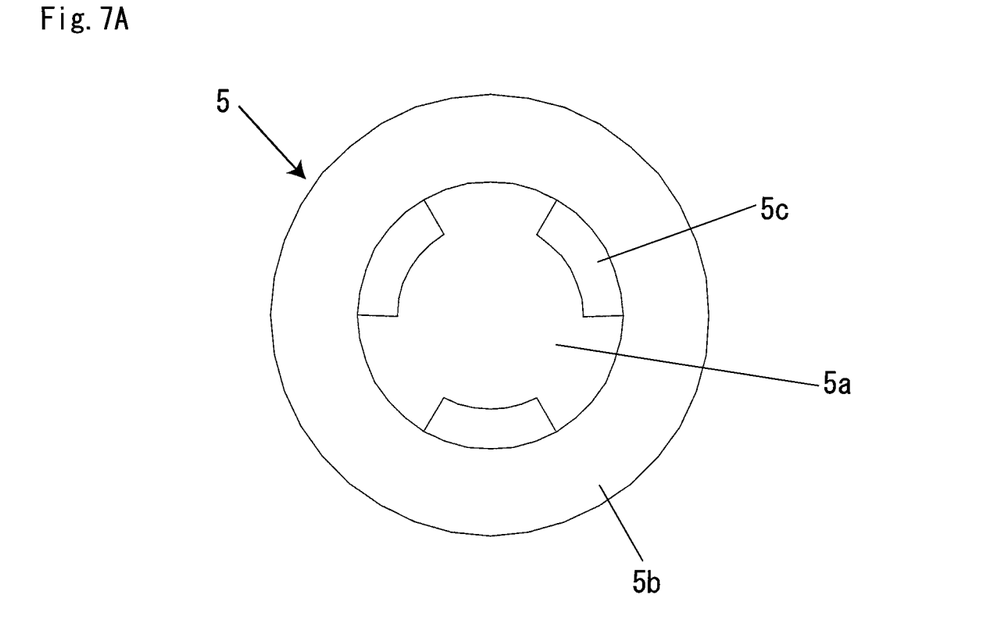
FIGS. 7A and 7B describe an overlap of gas releasing holes and break grooves in the sealed cell according to Example 2.
Figure 7B:
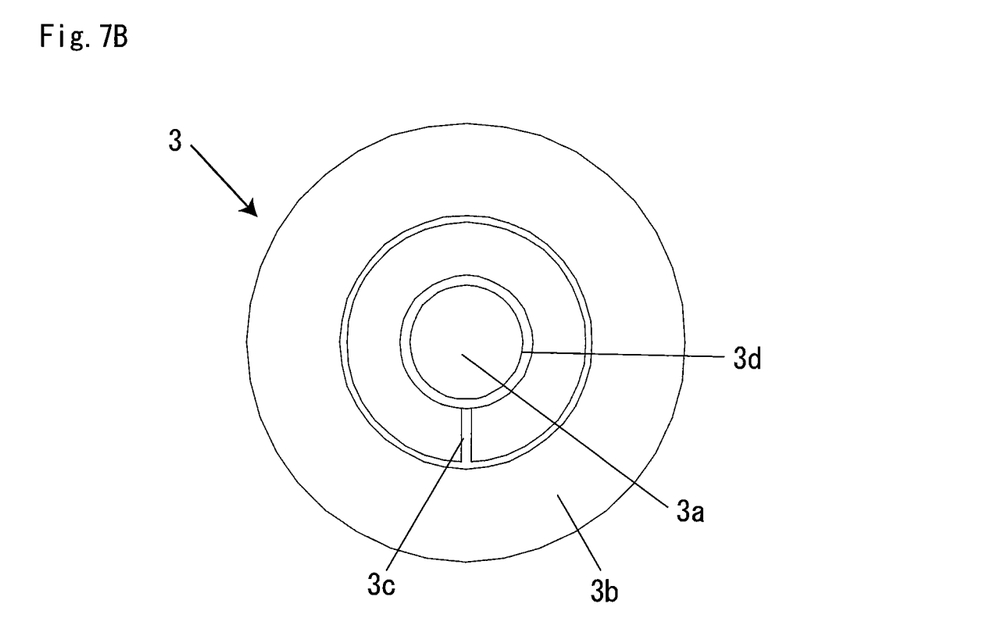

Cells according to Example 2 were manufactured in the same manner as in the above Embodiment except that one radial break groove 3c is formed in the safety valve 3 so as to overlap with any one of the gas releasing holes 5c as shown in FIGS. 7A and 7B.

COMPARATIVE EXAMPLE 1

Figure 8A:
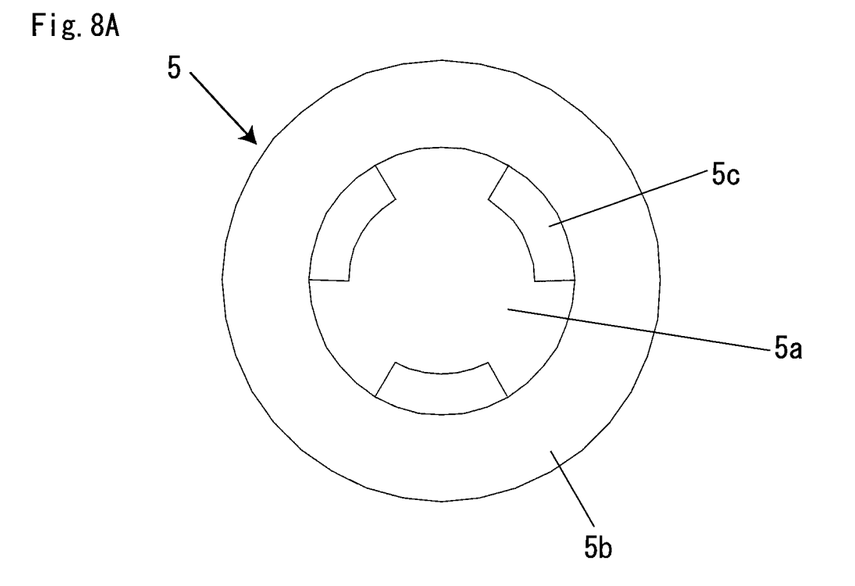
FIGS. 8A and 8B describe an overlap of gas releasing holes and break grooves in the sealed cell according to Comparative Example 1.
Figure 8B:
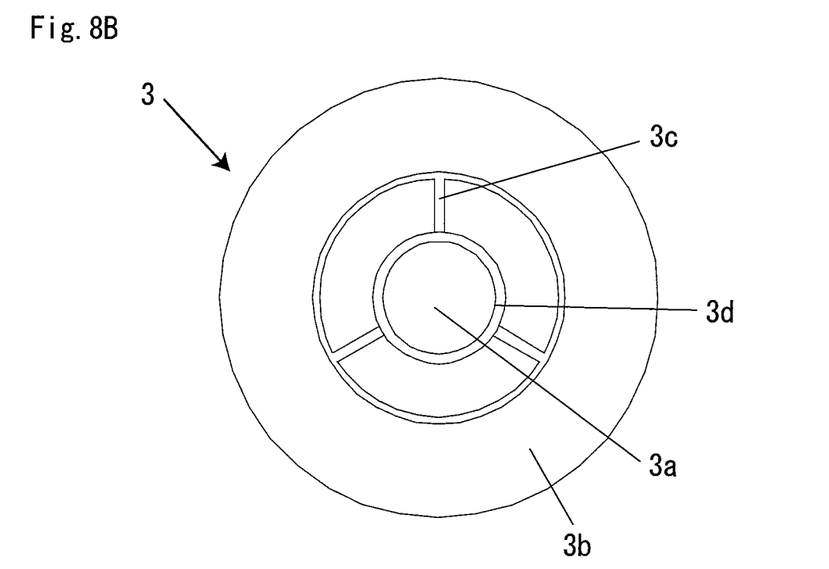

Cells according to Comparative Example 1 were manufactured in the same manner as in the above Embodiment except that the radial break grooves 3c are formed in the safety valve 3 so as not to overlap with the gas releasing holes 5c as shown in FIGS. 8A and 8B.

COMPARATIVE EXAMPLE 2

Figure 9A:
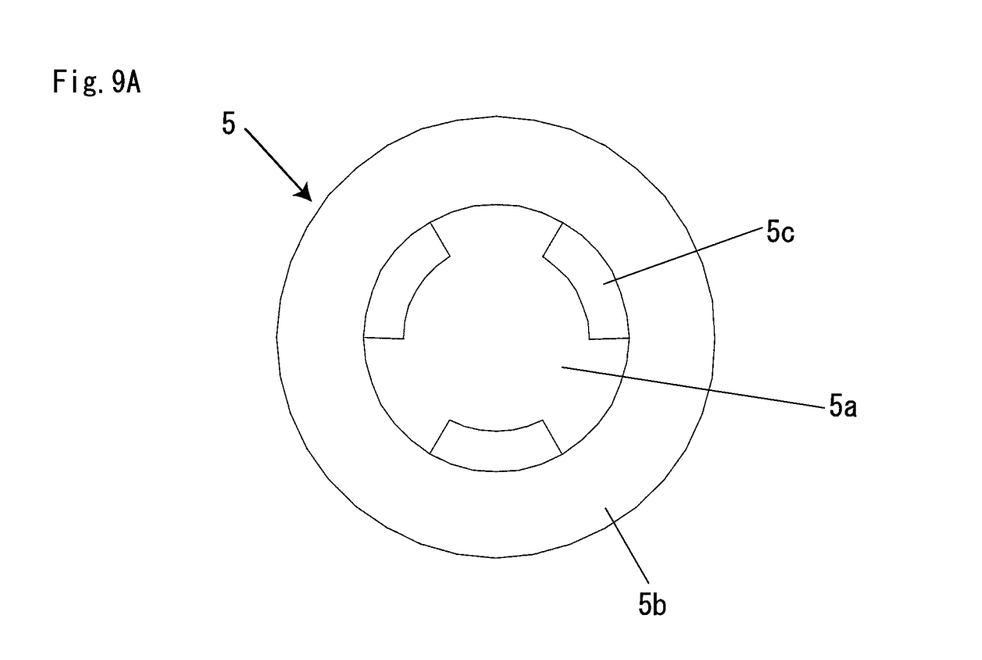
FIGS. 9A and 9B describe an overlap of gas releasing holes and a safety valve in the sealed cell according to Comparative Example 2.
Figure 9B:
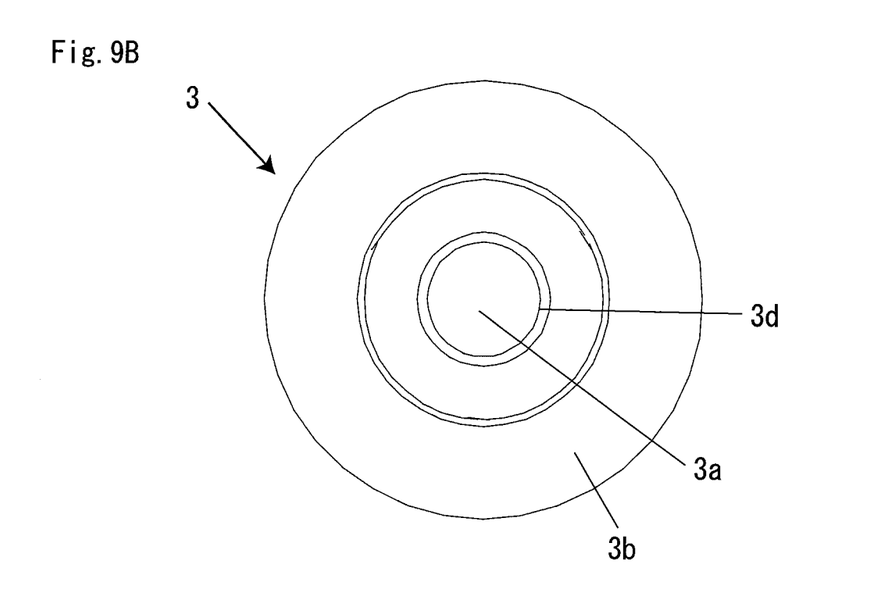

Cells according to Comparative Example 2 were manufactured in the same manner as in the above Embodiment except that no radial break groove 3c is formed in the safety valve 3 as shown in FIGS. 9A and 9B.

COMPARATIVE EXAMPLE 3

Cells according to Comparative Example 3 were manufactured in the same manner as in Comparative Example 2 except that the height L5 of the terminal cap is 2.2 mm.

<Combustion Experiment>

Twenty cells were manufactured as each of Examples 1 and 2 and Comparative Examples 1-3. All cells were charged at a constant current of 1 It (1250 mA) until the voltage reached 4.2V. After the cells were burned using a burner, two following numbers were measured:

the number of cells in which the bend portion 21 (cf. FIG. 1) of the outer can was extended during burning; and the number of cells that was ruptured during burning.

TABLE 1

| | Overlap of gas releasing holes and radial break grooves | Height of Terminal Cap (mm) | Combustion Experiment | |
|---|---|---|---|---|
| | | | Number of Extension | Number of Rupture |
| Example 1 | FIGS. 3A and 3B | 1.8 | 1 | 0 |
| Example 2 | FIGS. 7A and 7B | 1.8 | 3 | 0 |

TABLE 1-continued

| | Overlap of gas releasing holes and radial break grooves | Height of Terminal Cap (mm) | Combustion Experiment | |
|---|---|---|---|---|
| | | | Number of Extension | Number of Rupture |
| Comparative Example 1 | FIGS. 8A and 8B | 1.8 | 6 | 2 |
| Comparative Example 2 | FIGS. 9A and 9B | 1.8 | 7 | 3 |
| Comparative Example 3 | FIGS. 9A and 9B | 2.2 | 2 | 0 |

The results in Table 1 indicate the following. In Examples 1 and 2 in which the height of the terminal cap is 1.8 mm and at least one radial break groove is overlapped with the gas releasing hole, the numbers of extended cells are 1 and 3, respectively, and the numbers of ruptured cells are both 0. On the other hand, Comparative Example 3 shows that the number of extended cells is 2 and the number of ruptured cells is 0. Therefore, the safety of the cell in Examples 1 and 2 is almost the same as that in Comparative Example 3 in which the height of the terminal cap is 2.2 mm and no radial break groove is overlapped with the gas releasing hole.

Moreover, the results in Table 1 also indicate the following. In Examples 1 and 2 in which the height of the terminal cap is 1.8 mm and at least one radial break groove is overlapped with the gas releasing hole, the numbers of extended cells are 1 and 3, respectively, and the numbers of ruptured cells are both 0. Meanwhile, Comparative Examples 1 and 2 show that the numbers of extended cells are 6 and 7 and the numbers of ruptured cells are 2 and 3, respectively. Therefore, the cells according to Examples 1 and 2 are safer than the cells according to Comparative Examples 1 and 2 in which the height of the terminal cap is 1.8 mm and no radial break groove is overlapped with the gas releasing hole.

The reasons for these results are considered as follows. When an internal short circuit occurs or when heat is applied from outside, a gas is generated due to decomposition of the electrolyte, or the electrode assembly burns, and thus the cell internal pressure increases. Thereby, the conductive contact portion 3a is pushed up toward the outside of the cell. This action results in the breakage of the break groove of the terminal plate 1, thereby interrupting current supply to the terminal cap 5. Thereafter, the safety valve 3 is further deformed due to the internal pressure, thus breaking at the notch 3d and then at the break groove 3c. In this situation, when the gas releasing holes 5c overlaps with the radial break grooves 3c as described in Examples 1 and 2, the safety valve 3 cannot deform so as to block the gas releasing holes 5c. On the other hand, when the gas releasing holes 5c and the radial break groove 3c do not overlap, the safety valve 3 may sometimes block the gas releasing hole 5c. In this case, the internal gas in the cell cannot be smoothly released outside. Therefore, the increase of the internal pressure of the cell cannot be controlled rapidly, and thus the internal pressure further increases. For this reason, the bend portion 21 of the outer can 20 may be easily extended, and the rupture of the cell may occur. In Comparative Example 3, in which there is provided a sufficient space by setting the height of the terminal cap to 2.2 mm and thus the safety valve is hard to block the gas releasing hole, the safety is sufficiently ensured but this structure is disadvantageous for volume energy density. Furthermore, in Comparative Examples 1 and 2, in which the height of the terminal cap is set to 1.8 mm so as to increase volume energy density, the safety is not sufficient.

Moreover, comparing the results of Examples 1 and 2, it is preferred that two or more gas release holes 5c and two or more radial break grooves 3c are formed, and that each of the gas releasing holes 5c overlaps with each of break grooves 3c in planar view of the sealed cell in order to further enhance the safety.

Additions

The performance of gas releasing increases with size of the gas releasing holes 5c. However, the larger the size is, the more the strength of the holes decreases. In view of its strength, it is preferable that the gas releasing holes 5c occupies 70% or less of the peripheral wall of the external terminal 5a.

It is preferable that the depth of the radial break groove 3c is 150 μm or less, and is set to the same as that of the circular notch 3d. And it is preferable that the radial break groove 3c is formed more internally than the flange 5b of the terminal cap.

Moreover, it is preferable that the number and location of the gas releasing holes 5c of the terminal cap is the same as those of the radial break grooves 3c.

Figure 10A:
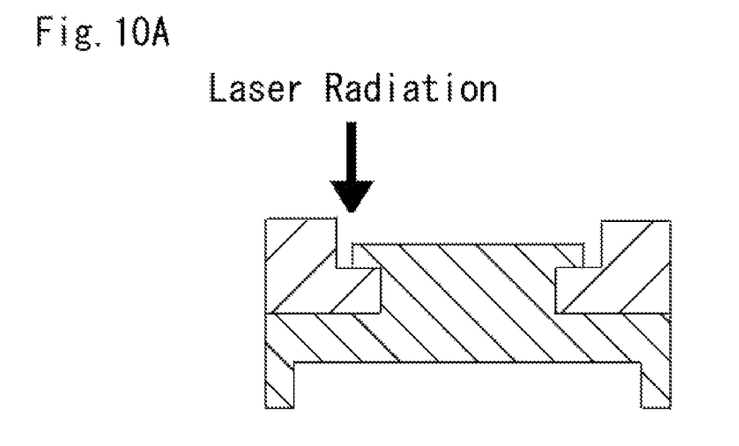
FIGS. 10A and 10B describe a preferable process for welding together a terminal cap and a safety valve of a sealed cell.
Figure 10B:
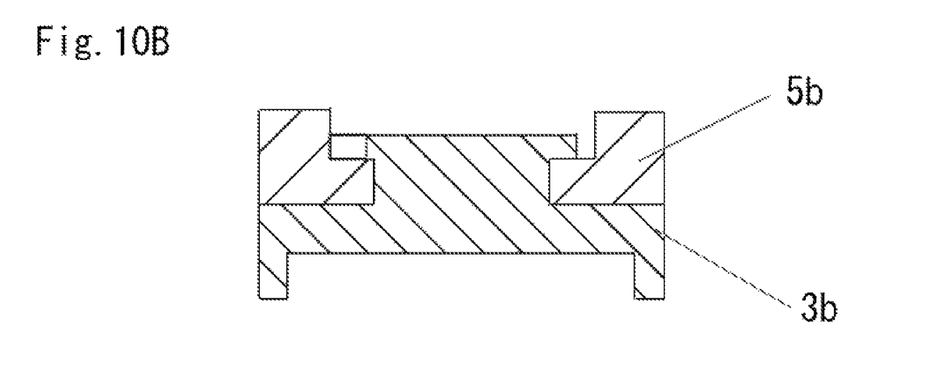

The terminal cap 5 and the safety valve 3 may be fixed by welding. In this case, for the purpose of obtaining a strong weld, high-energy radiation such as a laser beam is preferably applied to the terminal cap side, which has a high melting point, in the riveted portion as shown in FIGS. 10A and 10B.

As described hereinbefore, the present invention provides a sealed cell having a sealing body with a space-saving safety valve that has excellent safety and high volume energy density, thereby providing high industrial applicability.

What is claimed is:

1. A sealed cell comprising:
a bottomed cylindrical outer can; and
a sealing body caulked and sealed around an opening of the outer can, wherein
the sealing body includes:
a terminal cap, the terminal cap including an external terminal projecting toward an outside of the sealed cell, a flange portion in a periphery of the external terminal, and one or more gas releasing holes for releasing a gas from inside to outside of the cell, the gas releasing holes being provided in the external terminal; and
a safety valve, the safety valve including a conductive contact portion projecting toward an inside of the sealed cell, a peripheral portion in a periphery of the conductive contact portion, a circularly formed notch, and two or more break grooves formed radially in the peripheral portion and communicated with the notch,
wherein at least one of the gas releasing holes overlap with at least one of break grooves in a planar view of the sealed cell, wherein:
the number of the gas releasing holes is the same as that of the break grooves; and
each of the gas releasing holes overlaps a corresponding one of the break grooves in planar view of the sealed cell.

2. The sealed cell of claim 1, wherein the terminal cap and the safety valve are fixed together by rivets.

3. The sealed cell of claim 1, wherein the depth of the break groove is 150 μm or less.

4. The sealed cell of claim 1, wherein the depth of the break groove is the same as the depth of the notch.

5. The sealed cell of claim 2, wherein the riveted portion is welded by applying high-energy radiation to the terminal cap side having a high melting point.

* * * * *